(12) United States Patent
Liu et al.

(10) Patent No.: US 11,307,133 B2
(45) Date of Patent: Apr. 19, 2022

(54) DEVICE FOR ILLUMINATING A PARTICLE, AND A SYSTEM AND A METHOD FOR PARTICLE IMAGING

(71) Applicant: IMEC VZW, Leuven (BE)

(72) Inventors: Chengxun Liu, Kessel-lo (BE); Dries Vercruysse, Sint-Andries (BE); Niels Verellen, Heverlee (BE); Abdulkadir Yurt, Heverlee (BE)

(73) Assignee: IMEC VZW, Leuven (BE)

( * ) Notice: Subject to any disclaimer, the term of this patent is extended or adjusted under 35 U.S.C. 154(b) by 151 days.

(21) Appl. No.: 16/957,101

(22) PCT Filed: Dec. 19, 2018

(86) PCT No.: PCT/EP2018/085719
§ 371 (c)(1),
(2) Date: Jun. 22, 2020

(87) PCT Pub. No.: WO2019/121836
PCT Pub. Date: Jun. 27, 2019

(65) Prior Publication Data
US 2021/0364409 A1 Nov. 25, 2021

(30) Foreign Application Priority Data

Dec. 22, 2017 (EP) .................................... 17210475

(51) Int. Cl.
*G01N 21/00* (2006.01)
*G01N 15/14* (2006.01)
*G01N 15/10* (2006.01)

(52) U.S. Cl.
CPC ....... *G01N 15/147* (2013.01); *G01N 15/1436* (2013.01); *G01N 2015/1006* (2013.01); *G01N 2015/1454* (2013.01)

(58) Field of Classification Search
CPC .... G01J 3/02; G01J 3/513; G01J 3/51; G01N 15/1459; G01N 21/65
(Continued)

(56) References Cited

U.S. PATENT DOCUMENTS 6,249,341 B1 6/2001 Basiji et al.
8,941,062 B2 1/2015 Wagner et al.

FOREIGN PATENT DOCUMENTS

WO WO-20170055290 A1 4/2017
WO WO-2018054852 A1 3/2018

OTHER PUBLICATIONS

Jianglai Wu, Jianping Li, and Robert K.Y. Chan, "A light sheet based high throughput 3D-imaging flow cytometer for phytoplankton analysis," Opt. Express 21, 14474-14480 (2013).
(Continued)

*Primary Examiner* — Md M Rahman
(74) *Attorney, Agent, or Firm* — Moser Taboada

(57) ABSTRACT

A device (110) for illuminating a particle comprises: a light waveguide (112; 412a, 412b; 512a, 512b) arranged on a substrate (114); an output coupler (118) configured to output a light beam (150; 450a, 450b; 550a, 550b) forming a sheet-like shape having a cross-section which has an extension in a first direction being larger than a size of a particle; and a fluidic channel (116; 416; 516) arranged on the substrate (114) for guiding a flow of particles along a longitudinal direction of the fluidic channel (116; 416; 516); wherein the sheet-like shape of the light beam (150; 450a, 450b; 550a, 550b) is arranged within the fluidic channel (116; 416; 516) and the first direction of the cross-section of the light beam (150; 450a, 450b; 550a, 550b) forms an angle to the longitudinal direction of the fluidic channel (116; 416; 516). A system (100) for imaging the particle comprises the device, an array (130; 430a, 430b; 530) of light-detecting elements (132; 432a, 432b; 532); and a lens (120) to
(Continued)

converge light towards the array (130; 430*a*, 430*b*; 530) such that each light-detecting element (132; 432*a*, 432*b*; 532) detects light originating from a corresponding position in the fluidic channel (116; 416; 516).

15 Claims, 8 Drawing Sheets

(58) Field of Classification Search
USPC .......................................................... 356/73
See application file for complete search history.

(56) References Cited

OTHER PUBLICATIONS

Deschout et al. "On-chip light sheet illumination enables diagnostic size and concentration measurements of membrane vesicles in biofluids", Nanoscale, vol. 6, No. 3. Nov. 25, 2013, p. 1741-1747 United Kingdom.
Han et al. "Imaging Cells in Flow Cytometer Using Spatial-Temporal Transformation" Scientific reports/ 5;13267, DOI: 10.1038/srep13267.
Bates et al. "Optics-Interated Microfluidic Platforms for Biomolecular Analyses" Biophysical Journal, vol. 110, No. 8, Apr. 26, 2016, p. 1684-1697, XP055560852, Amsterdam, NL, ISSN: 0006-3495, DOI: 10.1016/j.bpj.2016.03.018 on chip lens systems; p. 1686, paragraph 1-p. 1687.
Diebold"Digitally synthesized beat frequency multiplexing for sub-millisecond fluorescence microcopy".
International Search Report for application No. PCT/EP2018/085719, dated Mar. 8, 2019.

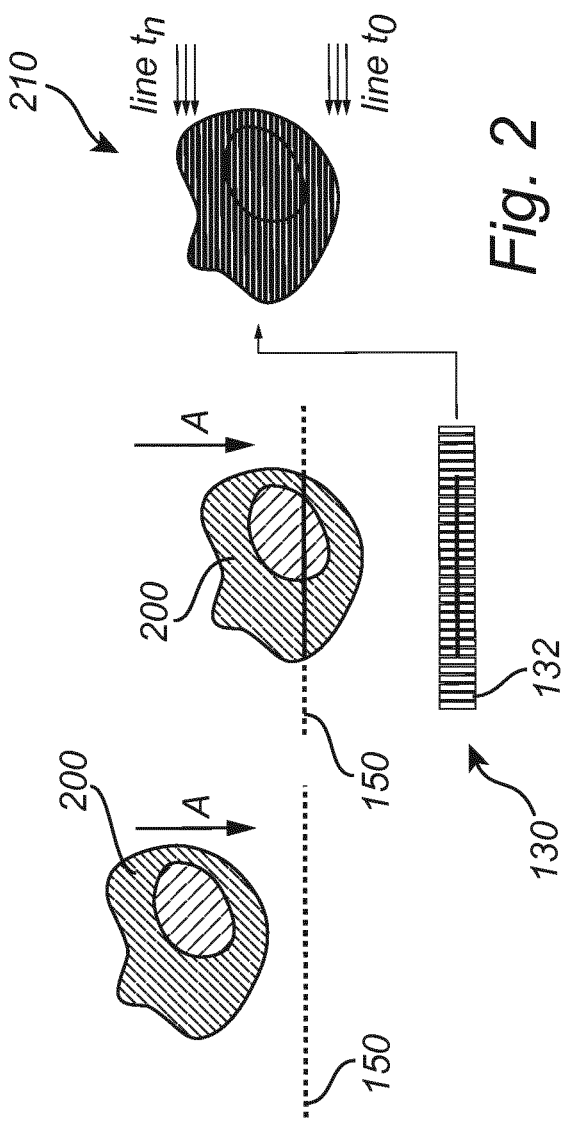

DEVICE FOR ILLUMINATING A PARTICLE, AND A SYSTEM AND A METHOD FOR PARTICLE IMAGING

TECHNICAL FIELD

The present inventive concept relates to a device for illuminating a particle in a fluidic channel. The present inventive concept also relates to a system and a method for particle imaging.

BACKGROUND

In flow cytometry, cells are suspended in a stream of fluid which may be passed through an electronic detection apparatus. A flow cytometer may allow simultaneous analysis of multiple physical and chemical characteristics of thousands of particles per second. Flow cytometry may typically be used in cell counting and cell sorting. However, morphology of cells may not be acquired in flow cytometry.

Microscopy, on the other hand, may generate images of cells and allow determining detailed information of cells with a higher spatial resolution than may be obtained in flow cytometry, such as determining cell morphology. However, microscopy may be limited by a very low throughput of cells.

Image cytometry acquires cell images for fast flowing cells in a flow cytometer. Image cytometry is an emerging technology combining advantages of cell microscopy (rich information but low throughput) and conventional flow cytometry (high throughput but limited information).

However, current image cytometry techniques require either dedicated and slow imagers or complicated optical systems. As a result, the cell imaging throughput is still not sufficient for practical applications, which may require imaging of 10000 cells/s or higher. Further, the complicated optics involved in current systems imply that the instruments are expensive and cumbersome to use.

An example of image cytometry is provided in Han Y., Lo Y.-H., "*Imaging Cells in Flow Cytometer Using Spatial-Temporal Transformation*", Scientific Reports 2015, No. 5. The method uses mathematical algorithms and a spatial filter as the only hardware needed to give flow cytometers imaging capabilities. Instead of CCDs or any megapixel cameras found in imaging systems, high quality image of fast moving cells is obtained in a flow cytometer using photomultiplier tube detectors, thus obtaining high throughput in manners fully compatible with existing cytometers.

However, the set-up is still bulky and requires a number of optical elements in a plurality of optical paths. Further, the throughput of the application may still need to be improved.

SUMMARY

An objective of the present inventive concept is to enable imaging of particles such that images with high spatial resolution may be obtained, while allowing a high throughput of particles.

These and other objectives of the present inventive concept are at least partly met by the invention as defined in the independent claims. Preferred embodiments are set out in the dependent claims.

According to a first aspect, there is provided a device for illuminating a particle in a fluidic channel, the device comprising: a light waveguide arranged on a substrate; an output coupler configured to output light from the light waveguide to form a light beam, wherein the light beam forms a sheet-like shape such that at a distance from the output coupler the light beam has a cross-section which has an extension in a first direction being larger than a size of a particle; and a fluidic channel arranged on the substrate for guiding a flow of particles through the fluidic channel along a longitudinal direction of the fluidic channel; wherein the light waveguide and the fluidic channel are arranged in relation to each other such that the light beam at said distance from the output coupler is arranged within the fluidic channel, wherein the first direction of the cross-section of the light beam forms an angle to the longitudinal direction of the fluidic channel.

Thanks to the invention, there is provided a compact set-up for illuminating a particle. The set-up may be used for imaging of the particle such that the particle may be imaged with a high spatial resolution. Furthermore, the imaging may be enabled with high throughput such that speed of particles through the fluidic channel may be very high.

By means of the fluidic channel and the light waveguide being arranged on the same substrate, a compact set-up for illumination is provided. The light waveguide may be formed on a substrate using semiconductor processing, which is suitable for mass production and enables miniaturization to form a small-size set-up. Also, the fluidic channel may be formed on the substrate by directly fabricating a structure defining the fluidic channel on the substrate, or the fluidic channel being manufactured separately and then bonded to the substrate comprising the light waveguide.

The light beam forming a sheet-like shape implies that the light beam may selectably illuminate the particle or a portion of the particle. The sheet-like shape may define a thickness (along a direction of flow of particles in the fluidic channel) which is being illuminated. This implies that the illumination may select a portion in the fluidic channel which interacts with illumination light and may hence select this portion for imaging.

This may be advantageously combined with an image sensor which includes one or a few rows of light-detecting elements. The image sensor does therefore not need to read out light intensity values from a large array of light-detecting elements. Rather, each light-detecting element that is to provide a light intensity value to be read out may be associated with its own read-out element (e.g. an analog-to-digital converter). This implies that read out of image information in terms of light intensity detected by light-detecting elements may be performed very quickly and hence imaging may be allowed while having a high throughput through the fluidic channel.

As used herein, the term "the light beam forms a sheet-like shape" should be construed as the light beam having a cross-section with a substantially rectangular shape and which is relatively uniform in a propagation direction of the light beam through the fluidic channel. It should be understood that the cross-section need not be exactly rectangular, but may be rounded at edges of the cross-section. Further, it should be understood that the cross-section need not be exactly uniform. On the contrary, the cross-section may be slightly narrowing or slightly expanding within the fluidic channel, or even first narrowing within the fluidic channel towards a smallest cross-section within the fluidic channel and then expanding within the fluidic channel.

The device may be used for illuminating any kind of inorganic or organic particles, man-made or natural particles. For example, polystyrene particles, silicon oxide particles, metal particles, magnetic particles; biological cells, bacteria, virus, extracellular vesicles, or the aggregate of the same or different particles may be illuminated by the device so as to allow imaging of the particle.

According to an embodiment, the output coupler is configured to output light, wherein the light beam has a cross-section which has a large extension in the first direction and a small extension in a second direction, the small extension being smaller than the size of a particle.

Thanks to the light beam having a cross-section with a large extension being larger than the size of the particle and a small extension being smaller than the size of the particle, the light beam may illuminate a slice through a particle. This implies that the illumination may select a portion of the particle which interacts with illumination light and may hence select this portion for imaging.

Thereby, the illumination selects the slice through the particle that is imaged during a specific point in time. The light interacting with the particle may be transmitted onto a single or a few rows of light-detecting elements for quickly reading light information. This implies that, as the particle moves through the fluidic channel, a sequence of slices of the particle may be illuminated and imaged in a very fast manner, such that the sequence of imaged slices may then form a complete image of the particle.

Thus, the device for illuminating a particle enables particle imaging with a high spatial resolution while allowing a high throughput of particles. For example, in one embodiment, a 1 MHz readout from the light-detecting elements may be used, which may allow a particle flow speed of 0.5 m/s using a 0.5 μm resolution.

According to an embodiment, the first direction of the light beam is transverse to the longitudinal direction of the fluidic channel.

This implies that a particle flowing through the fluidic channel will pass through the light beam such that an entire cross-section of the particle (in a direction transverse to the movement of the particle) may be illuminated by the light beam. Hence, the entire cross-section of the particle may be illuminated and imaged.

The light beam may be arranged such that the first direction of the light beam extend mainly through a center of the fluidic channel. This may be advantageous, because if light interacts with a side wall of the fluidic channel, it may affect imaging of the particle in the fluidic channel.

However, the first direction of the light beam need not be exactly transverse to the longitudinal direction of the fluidic channel. The first direction may illuminate a cross-section of the particle which is not transverse to the movement of the particle.

The first direction may be configured to form an angle to the longitudinal direction of the fluidic channel. This implies that the first direction should not be parallel to the longitudinal direction of the fluidic channel. However, if the angle between the first direction and the longitudinal direction of the fluidic channel is close to 0, the light beam may need to have a large extension such that an entire particle cross-section (traverse to the flow direction or longitudinal direction of the fluidic channel) will be illuminated by the light beam when the particle flows through the fluidic channel. The first direction may form an angle to the longitudinal direction of the fluidic channel in the range of 45-135°.

In other words, according to an embodiment, the extension in the first direction of the cross-section of the light beam extends substantially across a cross-section of the fluidic channel from a first side wall of the fluidic channel to a second side wall of the fluidic channel opposite to the first side wall. The extension need not be transverse to the longitudinal direction of the fluidic channel, but may form a line between the first and second side walls such that an entire cross-section of the particle flowing through the fluidic channel may still be illuminated.

According to an embodiment, the light waveguide and the fluidic channel are arranged in relation to each other such that the light beam from the output coupler enters the fluidic channel through a light entrance wall of the fluidic channel for propagating towards a light exit wall of the fluidic channel opposite to the light entrance wall, and wherein the light beam has a cross-section with a large extension and a small extension throughout the fluidic channel between the light entrance wall and the light exit wall.

This implies that the light beam may have a relatively uniform and sheet-like shape through an entire cross-section between the light entrance wall and the light exit wall of the fluidic channel. Hence, a position of the particle between the light entrance wall and the light exit wall will not affect possibility to image the particle. Further, the light beam will not differently illuminate different "heights" (i.e. different positions in the particle in a direction of propagation of the light beam) such that the light beam is not selective to information at a specific height in the particle. However, it should be realized that parts of a particle at a position farther away from the output coupler (i.e. along the propagation of the light beam) may be obstructed by light interacting with other parts of the particle before reaching such position.

According to an embodiment, the device further comprises a lens arranged on the substrate, wherein the lens is configured to receive light induced by the light beam interacting with a particle in the fluidic channel and converge the received light.

The lens may be configured to direct light originating from a position in the particle towards a single point. Thus, even if light from a position in the particle is spread over a large angle, e.g. through induced fluorescence which may directed to a broad range of angles, the light may be collected by a lens and directed towards a single point. This implies that in an image plane, specific points (in which light-detecting elements may be placed) may correspond to specific positions in the particle.

By arranging the lens on the substrate, a compact package comprising the light waveguide, the fluidic channel and the lens may be provided. Also, the relation between the lens and the light waveguide and the fluidic channel may be well-defined such that the lens will correctly converge the received light.

However, it should be realized that a lens may be provided separately from the substrate. The lens could thus be part of an imaging set-up, wherein the lens is separately mounted. The imaging set-up may be delivered in a pre-set equipment or may be set up by a user that is to perform imaging of particles.

According to an embodiment, the fluidic channel is arranged above the light waveguide on the substrate and the lens is arranged above the fluidic channel.

This implies that a stack may be formed of the light waveguide, the fluidic channel and the lens. A stacked set-up may facilitate fabrication of the device, as the different parts may be formed in different layers on the substrate.

However, it should be realized that the light waveguide and the fluidic channel, and possibly also the lens, may be formed on a common surface of the substrate, such that they are arranged in a common plane on the substrate. This implies that light may be output by the output coupler propagating in the common plane and through the fluidic channel.

It should also be realized that additionally or alternatively, a lens and the light waveguide may be arranged at a common side in relation to the fluidic channel. This implies that light back-scattered by a particle in the fluidic channel may be detected. If fluorescence is induced by the light beam, fluorescent light emitted generally backwards into a direction from which the light beam is received by the particle may be detected. It may be possible to detect light by detectors arranged both on an opposite side of the fluidic channel in relation to the light waveguide and on a common side of the fluidic channel in relation to the light waveguide.

According to an embodiment, the light waveguide is a first light waveguide and the output coupler is a first output coupler configured to form a first light beam and wherein the device further comprises a second light waveguide and a second output coupler for forming a second light beam, which forms a sheet-like shape such that at a distance from the second output coupler the second light beam has a cross-section with a large extension in a first direction and a small extension in a second direction.

This implies that a plurality of light beams may be provided for illuminating the particles. The light beams may have different characteristics for enabling acquiring more information about the particles in imaging of the particles.

According to an embodiment, the first light waveguide is configured to guide light of a first wavelength, whereas the second waveguide is configured to guide light of a second wavelength different from the first. Thus, the particles may be imaged using different wavelengths such that a spectral resolution may be provided to the imaging or that fluorescence by different substances may be induced.

According to an embodiment, the first output coupler is arranged to output the first light beam to enter the fluidic channel through a light entrance wall at a first cross-section of the fluidic channel and the second output coupler is arranged to output the second light beam to enter the fluidic channel through the light entrance wall at a second cross-section of the fluidic channel downstream to the first cross-section.

This implies that the particles may be sequentially illuminated by the first and second light beams as the particles flow through the fluidic channel. Hence, illumination and imaging based on the first and second light beams may be separate, which may facilitate set-up of both illumination and imaging, since the light beams will not interfere with each other and will not affect the respective imaging using the first and second light beams.

According to an embodiment, the sheet-like shape of the first light beam is configured to illuminate a first portion of the fluidic channel and the sheet-like shape of the second light beam is configured to illuminate a second portion of the fluidic channel, wherein the first and second portions of the fluidic channel are disjoint.

This implies that the light induced by the first light beam and the light induced by the second light beam are spatially separated, which may facilitate detecting of the induced light with a simple set-up of an imager, e.g. by using a first and a second array of light-detecting elements, each array being dedicated for detecting light induced by one of the first and the second light beam, respectively.

According to another embodiment, the sheet-like shape of the first light beam is tilted towards the second cross-section from the light entrance wall to a light exit wall of the fluidic channel and wherein the sheet-like shape of the second light beam is tilted towards the first cross-section from the light entrance wall to the light exit wall of the fluidic channel, such that the first light beam and the second light beam will intersect at a central portion of the fluidic channel.

This implies that the first and second light beams may illuminate the particles at a common position of the particle. Hence, the particle may be simultaneously illuminated. Thus, compared to sequential illumination, the particle may not have turned or otherwise changed its orientation between the illumination using the first and the second light beam. Therefore, images of the particle based on the first and the second light beam may be more easily compared.

Different characteristics of the light of the first and second light beams may be used for directing light having interacted with the particle in slightly different ways. Thus, a diffractive lens may be used with light beams of two different wavelengths in order to direct light to different positions in an image plane depending on the wavelength of light. This may enable simultaneous imaging of the particle while being illuminated by two light beams.

According to a second aspect, there is provided a system for particle imaging; said system comprising: a device for illuminating a particle according to the first aspect; and an array of light-detecting elements, wherein the array of light-detecting elements is configured such that each light-detecting element detects light originating from a corresponding position in the fluidic channel.

Effects and features of this second aspect are largely analogous to those described above in connection with the first aspect. Embodiments mentioned in relation to the first aspect are largely compatible with the second aspect.

The device for illuminating a particle of the first aspect is specifically suited to be used in a system for particle imaging. The system may or may not comprise a lens which may be integrated with a substrate of the device and may hence be considered to be part of the device, or may be separate from the substrate. Further, the system may comprise an array of light-detecting elements, wherein the array is arranged in relation to the fluidic channel of the device such that each light-detecting element detects light originating from a specific position in the fluidic channel. This implies that each light-detecting element corresponds to light from a specific position and acquired light intensities by the array of light-detecting elements may be used for imaging of the particle.

The system may be configured for holographic imaging. Thus, the array of light-detecting elements may be configured to detect an interference pattern based on object light being diffracted by the particle and reference light, which is not diffracted. The interference pattern may be acquired by the array of light-detecting elements and then, the acquired interference pattern may be reconstructed in order to determine an image of the particle.

The system may be configured for in-line digital holography, wherein the reference light is based on light of the light beam that passes unaffected through the particle. In-line digital holography may be useful, wherein a particle that is mostly transparent to light may be imaged. Thus, a large amount of light is unaffected by the object so that an interference pattern may be formed.

The system may alternatively be configured for off-axis digital holography. In such case, a separate light beam of reference light is configured to propagate in a reference path to reach the array of light-detecting elements, wherein the reference path by-passes the particle such that the reference beam passes unaffected by the particle through the reference path. The reference light beam may be based on a common source with the light beam illuminating the particle, such that the object light and reference light may be mutually coherent.

In holographic imaging, there may be no need to use a lens for focusing light. However, according to an alternative, the system may comprise a lens for converging light towards the array of light-detecting elements and for controlling origin of light reaching a light-detecting element in the array.

Thus, according to an embodiment of the second aspect, there is provided a system for particle imaging; said system comprising: a device for illuminating a particle according to the first aspect; an array of light-detecting elements; and a lens, which is configured to receive light induced by the light beam interacting with a particle in the fluidic channel and converge received light towards the array of light-detecting elements such that each light-detecting element detects light originating from a corresponding position in the fluidic channel.

The array of light-detecting elements may further be configured to receive light from a particular distance in relation to the lens. This implies that light out of focus may be blocked so as not to reach the array of light-detecting elements and that confocal imaging may be provided so as to increase optical resolution and/or contrast of an acquired image.

The system may comprise a blocking element defining a narrow slit for passing light towards the array of light-detecting elements for providing confocal imaging. For instance, the system may comprise an opaque sheet arranged close to the array of light-detecting elements, wherein a transparent slit is provided in the opaque sheet for passing light towards the array of light-detecting elements. According to an alternative, a size of the light-detecting elements may define the light reaching the respective light-detecting element for providing confocal imaging. Each light-detecting element may have a small extension, at least in a direction perpendicular to a row of the array, which may contribute to light out of focus of the lens not reaching the light-detecting element.

The device, lens (if any) and array of light-detecting elements may be mounted in a common housing or arrangement, such that a prepared equipment with correct relations between the device, the lens (if any) and the array is provided. The prepared equipment may thus be manufactured and delivered in a ready-to-use state to a user. However, it should be realized that the parts of the system may be delivered and/or manufactured as separate parts and may be assembled to form a system suited for particle imaging by an assembling party that receives the manufactured parts and delivers the prepared equipment or may be assembled by the end-user.

The array of light-detecting elements may be one-dimensional. This implies that a row of light-detecting elements may be provided. The light-detecting elements in the row may e.g. be formed as charge-coupled device (CCD) or as complementary metal-oxide-semiconductor (CMOS) light sensors, wherein light intensity from each light-detecting element may be read out by corresponding circuitry, such that read-out of the row of light-detecting elements may be very quickly performed. For instance, the read-out circuitry associated with each light-detecting element may comprise an analog-to-digital converter for converting the acquired light intensity to a digital value. It is feasible that such a set-up may reach read-out speeds of 1 MHz or more.

It should however be realized that the array of light-detecting elements need not necessarily be one-dimensional. For instance, two parallel rows of light-detecting elements may be associated with read-out circuitry on opposite sides of the parallel rows, such that the two parallel rows of light-detecting elements are arranged between two rows of read-out circuitry.

According to an embodiment, the array of light detecting elements may comprise a number of rows which are used for detecting light intensities, wherein each row may be associated with corresponding read-out circuitry in order to enable fast read-out of the detected light intensities.

For instance, the light having interacted with a particle is a "moving" signal because cells are flowing. This implies that there may be a Gaussian light distribution in the longitudinal direction along particle flow. The Gaussian light distribution may be determined using e.g. three light-detecting elements in different rows and arranged to correspond to three positions along the longitudinal direction of the fluidic channel. Signals acquired by these three light-detecting elements, one after another or simultaneously, can be used to detect the Gaussian light distribution so as to improve the signal reading accuracy.

Further, another advantage of having a plurality of rows of light-detecting elements in the array is that, a first row in the array can be used to detect presence of a particle in the fluidic channel, which may trigger a second and/or a third row in the array to start read-out for imaging of the particle.

According to an embodiment, the system comprises a device comprising a first light waveguide and a second light waveguide, wherein the array of light-detecting elements is a first array and the system further comprises a second array of light-detecting elements, wherein the first array is configured to receive light induced by the first light beam interacting with a particle in the fluidic channel and the second array is configured to receive light induced by the second light beam interacting with a particle in the fluidic channel.

Each of the first and the second array may be a one-dimensional array of light-detecting elements. However, as discussed above, the first and the second arrays may comprise a plurality of rows of light-detecting elements.

The light induced by the first light beam and the second light beam may be spatially separated, e.g. by the first light beam and the second light beam being arranged to illuminate the fluidic channel at different longitudinal positions of the fluidic channel. Thus, the first and the second array of light-detecting elements may be spatially separated.

However, as discussed above, the first and the second light beams may be arranged to intersect at a central portion of the fluidic channel. Using a diffractive lens and different wavelengths of light of the first and second light beams, the first and second arrays may still be spatially separated for receiving light induced by the first and the second light beams, respectively. However, the first and second arrays may then be arranged very close to each other. For instance, the first and the second arrays may each be a one-dimensional array, which are arranged parallel to each other and very close to each other. In such case, the first and second array may be associated with read-out circuitry on opposite sides of the parallel arrays, and the first and second arrays may also be considered to physically form a single two-dimensional array. However, the output from each of the first and the second array may be separately processed in order to enable forming separate images based on two different wavelengths. It should be realized that such separate images may later be combined as two different channels or in another manner in a combined image.

In one embodiment, the device is configured such that the first and the second light beams are not simultaneously emitted. Thus, even though the first and the second light waveguides and output couplers are arranged such that the light beams would intersect, only a single light beam is emitted at a time. Thus, the light beams may facilitate measurements from a common position in the fluidic channel even if the measurements are not performed simultaneously. It should be realized that with such a set-up a single array of light-detecting elements may be used for detecting light induced by the first light beam and light induced by the second light beam.

The system may further be configured for parallel imaging of particles. Thus, a plurality of fluidic channels may be provided such that imaging of particles in the plurality of fluidic channels may be simultaneously performed.

The system may thus be provided with a plurality of light waveguides, such that a light beam as described above may be output into each of the plurality of fluidic channels. The light waveguides may be associated with a single light source, which may input light to each of the light waveguides for illuminating the particles in the plurality of fluidic channels. Alternatively, each light waveguide may be associated with a separate light source.

The system may comprise separate arrays of light-detecting elements for detecting light from particles in different fluidic channels. However, according to an embodiment, the system may be set up such that a single array of light-detecting elements is used for detecting light originating from different fluidic channels.

In an embodiment, a large one-dimensional array of light-detecting elements may be provided, such that different light-detecting elements are configured to detect light from different fluidic channels. In another embodiment, a two-dimensional array of light-detecting elements may be provided, such that different rows of the array of light-detecting elements are configured to detect light originating from different fluidic channels. It should be realized that the array of light-detecting elements may be configured in other manners for detecting light from different fluidic channels.

According to an embodiment, the system further comprises a filter for removing excitation light from the light beam and passing fluorescence light induced by the light beam.

This implies that the system is adapted for fluorescence measurements. The filter may thus prevent any excitation light from reaching the array of light-detecting elements so that the excitation light would not interfere with fluorescence light measurements.

According to an embodiment, the method further comprises a processing unit, which is configured to receive a sequence of recorded light intensities by the array of light-detecting elements acquired while the particle moves through the fluidic channel and to combine the received sequence for forming a two-dimensional image of the particle.

The array of light-detecting elements may acquire an image of a slice or a cross-section of the particle. A sequence of acquired images by the array, such as a sequence of lines acquired by a one-dimensional array, may thus be combined by the processing unit in order to form a two-dimensional image.

According to a third aspect, there is provided a method for particle imaging, said method comprising: illuminating a particle moving through a fluidic channel, said particle being illuminated by means of a light beam that forms a sheet-like shape such that at a position within the fluidic channel, the light beam has a cross-section with a large extension in a first direction and a small extension in a second direction, the large extension being larger than a size of the particle and the small extension being smaller than the size of a particle; receiving light induced by the light beam interacting with a particle in the fluidic channel by an array of light-detecting elements such that each light-detecting element detects light originating from a corresponding position in the fluidic channel; recording a received light intensity by each of the light-detecting elements in the array for forming image information of a portion of the particle.

Effects and features of this third aspect are largely analogous to those described above in connection with the first and second aspects. Embodiments mentioned in relation to the first and second aspects are largely compatible with the third aspect.

According to this method, the sheet-like shape of the illumination light beam controls a portion of the fluidic channel being illuminated. Then, an array of light-detecting elements is used in order to detect light intensities and image the portion of the fluidic channel that is illuminated. The array of light-detecting elements may allow very quick read-out, e.g. by comprising a single or a few rows. This implies that a portion of a particle may be imaged in a very fast manner. Hence, the method allows a high flow speed through the fluidic channel while allowing particles in the fluidic channel to be imaged.

The method may be used for holographic imaging, as discussed above, wherein the array of light-detecting elements may detect an interference pattern based on diffracted and undiffracted light. However, according to an alternative, the method may be used for detecting light being focused by a lens towards the array of light-detecting elements.

Thus, according to an embodiment of the third aspect, there is provided a method for particle imaging, said method comprising: illuminating a particle moving through a fluidic channel, said particle being illuminated by means of a light beam that forms a sheet-like shape such that at a position within the fluidic channel, the light beam has a cross-section with a large extension in a first direction and a small extension in a second direction, the large extension being larger than a size of the particle and the small extension being smaller than the size of a particle; receiving, by a lens, light induced by the light beam interacting with a particle in the fluidic channel and converging the received light towards an array of light-detecting elements such that each light-detecting element detects light originating from a corresponding position in the fluidic channel; recording a received light intensity by each of the light-detecting elements in the array for forming image information of a portion of the particle.

According to an embodiment, the method further comprises acquiring a sequence of recorded light intensities while the particle moves through the fluidic channel, and combining the received sequence for forming a two-dimensional image of the particle.

Each frame (or line) read out from the array of light-detecting elements may provide image information for a portion of the particle. By stitching the image information for a number of sequential frames, an image of entire particle may be formed.

The acquiring of the sequence of recorded light intensities may be synchronized with the flow speed through the fluidic channel. Thus, sequential frames (or lines) acquired by the array may represent neighboring portions of the particle.

BRIEF DESCRIPTION OF THE DRAWINGS

The above, as well as additional objects, features and advantages of the present inventive concept, will be better understood through the following illustrative and non-limiting detailed description, with reference to the appended drawings. In the drawings like reference numerals will be used for like elements unless stated otherwise.

FIG. 2 is a schematic view illustrating imaging of a cell moving through a fluidic channel.

DETAILED DESCRIPTION

Figure 1A:
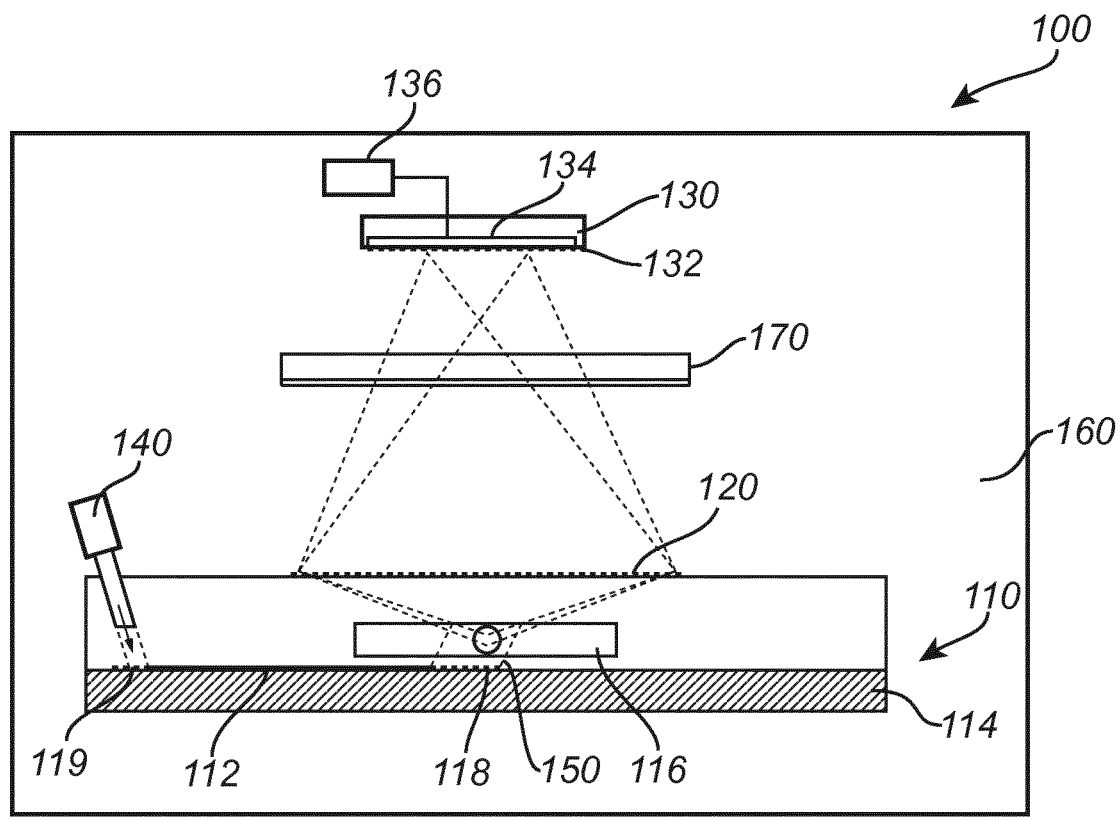
FIG. 1a is a schematic view of a system for particle imaging according to a first embodiment.

Referring now to FIG. 1a, a system 100 for particle imaging will be described. The system comprises a device 110 for illuminating a particle, a lens 120 for converging light having interacted with the particle, and an array 130 of light-detecting elements 132 for detecting a received light intensity.

The device 110 for illuminating the particle, which will be described in more detail below, may comprise a light waveguide 112 arranged on a substrate 114 and a fluidic channel 116, which is also arranged on the substrate. A flow of a fluid carrying particles may be transported through the fluidic channel 116. The light waveguide 112 may be provided with an output coupler 118 for forming a light beam out from the light waveguide 112 and directing the light beam towards the fluidic channel 116.

The device 110 may further comprise an input coupler 119 for receiving light into the light waveguide 112. The input coupler 119 may be configured to receive light from an external light source 140 and may be configured to couple the light from the light source 140 into the light waveguide 112. A mirror may be arranged beneath the input coupler 119 for improving coupling of light into the light waveguide 112.

The light source 140 may be a laser, which may facilitate providing a well-defined light beam out from the light waveguide.

The light source 140 may be associated with an alignment mechanism for adjusting position and angle of the incoming light beam to the input coupler 119 so as to ensure that coupling loss is minimized or reduced.

The output coupler 118 may be configured such that a light beam 150 with a sheet-like shape may be formed in the fluidic channel 116. The light beam 150 may thus select a portion in the fluidic channel 116 which will be illuminated.

The input coupler 119 and the output coupler 118 may each be formed by a grating. This may enable diverting light and may also facilitate shaping a light beam leaving the coupler. However, it should be realized that the input coupler 119 and the output coupler 118 may be formed by other structures. For instance, at least the input coupler 119 may be formed by a reflecting surface, which may divert light from the external light source 140 into the light waveguide 112.

The light beam 150 may form a sheet through the fluidic channel 116 forming an angle with the longitudinal direction of the fluidic channel 116. For instance, the sheet may be transverse to the longitudinal direction of the fluidic channel 116. The sheet-like shape may have a first direction extending between side walls of the fluidic channel such that the first direction defines a width of the light beam. The width may be larger than a size of a particle and may be arranged in a central portion of the fluidic channel 116 between the side walls. This implies that the light beam 150 will not interact with side walls of the fluidic channel, which may otherwise cause an interference with imaging of the particles.

The illumination by the light beam 150 in the fluidic channel 116 implies that particles flowing through the fluidic channel 116 will pass through the sheet of the light beam 150 and that an entire width of the particle (as extending between the side walls of the fluidic channel) will be illuminated by the light beam 150. The sheet of the light beam 150 may also be very thin in a second direction perpendicular to the first direction, which may be along the longitudinal direction of the fluidic channel 116.

The thickness of the light beam 150 may thus select a cross-section of the particle that is imaged by the light beam 150, at an instant in time. However, it should be realized that the thickness of the light beam 150 may be coarser, even exceeding a size of the particle. This may imply that the selection of the portion of the fluidic channel 116 being illuminated is not very detailed and only a coarse imaging of the particle may be provided, mainly allowing details along the first direction of the light beam 150 to be discerned.

However, in an embodiment, the sheet of the light beam 150 may be smaller than the size of the particle and in some embodiments much smaller than the size of the particle. This implies that the light beam 150 may select a particular cross-section of the particle. The arrangement of the light beam 150 aids in selecting a portion of the particle that will be imaged at a point in time.

The lens 120 may be integrated with the substrate 114 on which the light waveguide 112 and the fluidic channel 116 is formed. According to another embodiment, the lens 120 may be separately arranged, at a distance from the fluidic channel 116. The lens 120 may for example be a microfabricated Fresnel lens, which may in particular be suitable for arrangement on the substrate 114. It should also be realized that the lens 120 may comprise a plurality of optical elements together forming a lens system.

The lens 120 may be configured to receive light induced by the light beam 150 interacting with the particle in the fluidic channel 116. The lens 120 may be configured to receive light being directed by the particle into a relatively large solid angle. The lens 120 may further be configured to converge the received light towards an image plane. Thus, light originating from a point on the particle will be focused onto a single point on the image plane.

The array 130 of light-detecting elements 132 may be arranged in the image plane, such that each light-detecting element 132 may receive light from a specific point on the object. Thus, the array of light-detecting elements 132 may provide image information so as together form an image of the illuminated portion of particle.

The light-detecting elements 132 in the array may e.g. be formed as charge-coupled device (CCD) or as complementary metal-oxide-semiconductor (CMOS) light sensors, wherein the light-detecting element 132 is configured to accumulate a charge or generate a voltage in relation to the received light intensity.

A representation of the received light intensity in the light-detecting element 132 may be read out from the light-detecting element 132 using a readout circuitry 134. Each light-detecting element 132 may be associated with corresponding circuitry dedicated to the light-detecting element 132, such that read-out of the information in the array 130 of light-detecting elements 132 may be very quickly performed.

The array 130 of light-detecting elements 132 may be relatively small, comprising a single row or a few rows of light-detecting elements 132. This implies that each light-detecting element 132 may be associated with dedicated readout circuitry 134 without compromising a needed spatial resolution of the array 130.

Thanks to the light beam 150 being arranged to select a portion in the fluidic channel 116 that is to be imaged at a specific point in time, the array 130 of light-detecting elements 132 may be configured with a simple structure so as to enable very fast readout of the image information in the array 130. This also implies that a high throughput may be used in the fluidic channel 116.

The readout circuitry 134 may be connected to a processing unit 136 for processing the image information acquired by the array 130. The readout circuitry 134 may comprise analog-to-digital converters (ADC), e.g. one ADC associated with each light-detecting element 132. Thus, the processing unit 136 may receive a digital representation of the detected light intensities, which may facilitate processing of the image information.

The processing unit 136 may be implemented in hardware, or as any combination of software and hardware. At least part of the functionality of the processing unit 136 may, for instance, be implemented as software being executed on a general-purpose computer. The system 100 may thus comprise one or more processing units, such as a central processing unit (CPU), which may execute the instructions of one or more computer programs in order to implement desired functionality.

The processing unit 136 may alternatively be implemented as firmware arranged e.g. in an embedded system, or as a specifically designed processing unit, such as an Application-Specific Integrated Circuit (ASIC) or a Field-Programmable Gate Array (FPGA).

The system 100 may be implemented as an analysis equipment providing a pre-defined analysis set-up with the components of the system 100 being arranged in a well-defined and pre-set relation to each other. This implies that i.a. the device 110 for illuminating particles, the lens 120 and the array 130 of light-detecting elements 132 may be mounted in a common housing 160 or arrangement, such that the prepared equipment with correct relations between the device 110, the lens 120 and the array 130 is provided. The prepared equipment may thus be manufactured and delivered in a ready-to-use state to a user. When the equipment is to be used, the user need only lead the fluid to be analyzed into the fluidic channel 116 in order to allow the equipment to start analysis of particles in the fluidic channel 116.

However, it should be realized that the system 100 may be set up by an end-user based on parts suitable to be used in the system 100. Thus, a user may receive the device 110 for illuminating a particle, with or without an integrated lens 120 on the substrate 114 of the device 110. The user may then use conventional optics and array 130, such as a one-dimensional array 130 of light-detecting elements 132 in order to set up the system 100 for particle imaging.

The system 100 may be used for acquiring bright field, dark field and/or fluorescence images. The set-up of the system 100 may be adapted, e.g. with regard to an angle of the light beam 150 and a filter set 170, for respective type of imaging.

Bright field images may be taken when the illuminating light beam 150 is collected by the lens 120 after illuminating the particle.

Dark field images may be taken when the illuminating light beam 150 is tilted or the array 130 is otherwise arranged to be shifted away from a propagation direction of the light beam 150. Thus, side scattered light, not the main illuminating light beam 150, is collected by the array 130.

As for dark field imaging, a tilted illuminating light beam 150 may also be used for fluorescence imaging. Further, the emitted light from the particle, converged by the lens 120, may further pass through a filter 170 to remove the (scattered) excitation light component.

The filter 170 may typically be a combined notch filter and a bandpass filter. The filter 170 may be separately arranged from the device 110, so as e.g. to be mounted in an appropriate position in the housing 160.

The filtered light may be refocused by a further lens structure (not shown) in order to properly focus the light onto the array 130 of light-detecting elements 132.

Figure 1B:
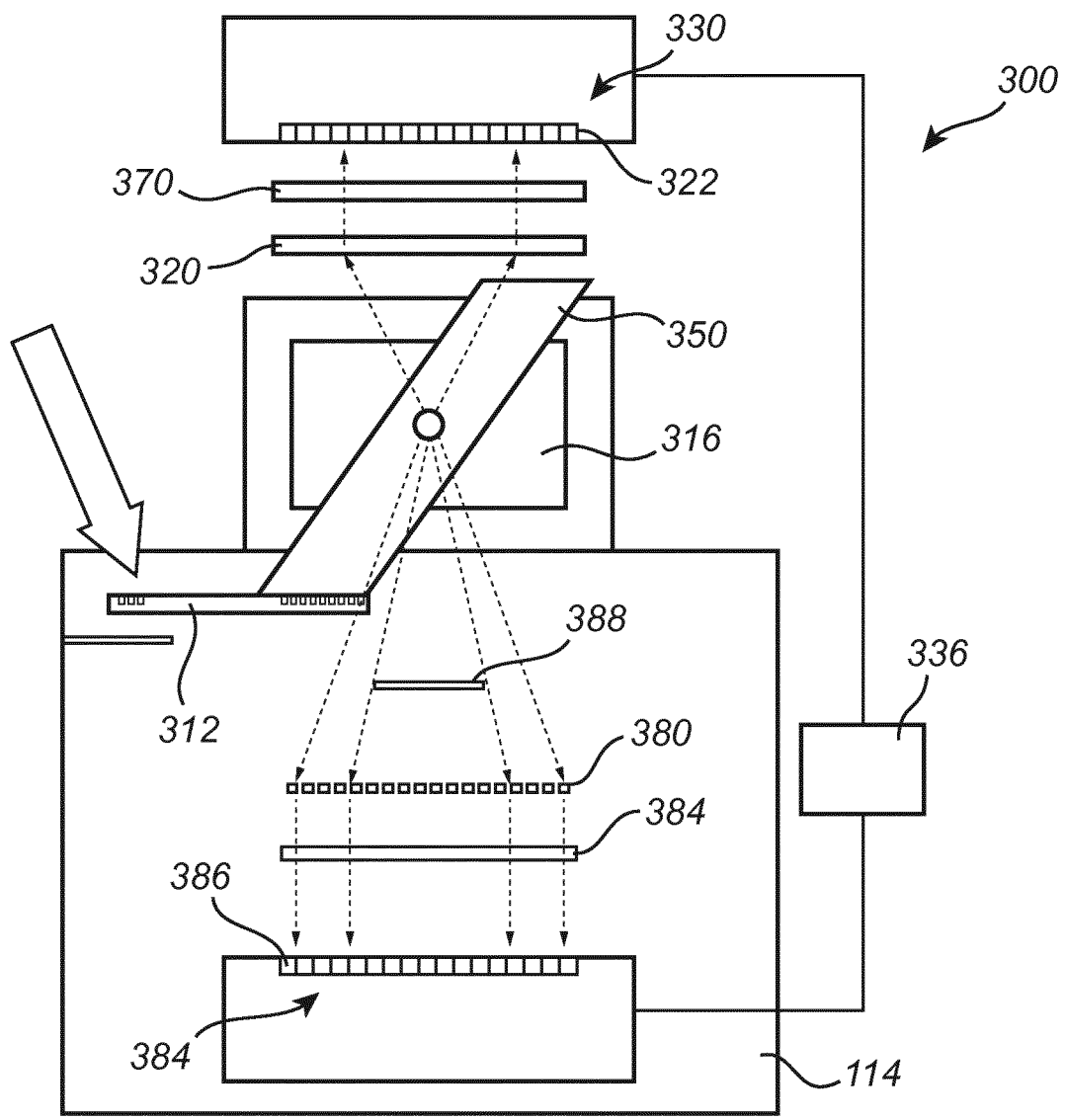
FIG. 1b is a schematic view of a system for particle imaging according to a second embodiment.

Referring now to FIG. 1b, a system 300 may be used for acquiring light being both forward-scattered and back-scattered. Also or alternatively, fluorescence light being induced in a direction above and below the fluidic channel 116 may be detected.

The system 300 may comprise a lens 320, a filter 370 and an array 330 of light-detecting elements 332, as described above. Also, the system 300 may comprise a light waveguide 312 with an output coupler 318 for outputting a light beam 350 and a fluidic channel 316, as described above.

However, the system 300 may also comprise a lens 380 integrated on the substrate 314 and arranged below the light waveguide 312 and the fluidic channel 316. Hence, this lens 380 and the light waveguide 312 are arranged on a common side in relation to the fluidic channel 316. This implies that light emitted by a particle in the fluidic channel 316 in a backwards direction may be received and converged by the lens 380, in a similar manner as for the lens 320 arranged on an opposite side of the fluidic channel 316 in relation to the light waveguide 312.

Further, the system 300 may also comprise a filter 382 and an array 384 of light-detecting elements 386 on the substrate below the lens 380 so as to ensure that light interacting with particles in the fluidic channel 316 in a backwards direction is detected in a similar manner as described above for imaging of the particles based on backwards emitted light.

The system 300 may further comprise a mirror 388 or other element which may be configured to block light being directly reflected by the particle in the fluidic channel 316. The intensity of reflected light, e.g. of an excitation wavelength in fluorescence imaging, may be much higher than the light of interest for imaging the particle. Therefore, the mirror 388 may be used to prevent directly reflected light from reaching the lens 380 and the array 384. Compared to the set-up for a top array 330, which may be arranged not to receive an excitation wavelength due to the light beam 350 being tilted in the fluidic channel, a bottom array 384 may be arranged much closer to the fluidic channel 316, as the array 384 may be integrated on the substrate 314. Thus, the mirror 388 may be needed in order to enable the fluorescence light not to be drowned in a high intensity of reflected light.

The system 300 may comprise a top detector 330 and a bottom detector 384 for imaging the particles in the fluidic channel 316 from two sides.

The processing unit 336 may be configured to receive image information from both the arrays 330, 384 for processing the image information acquired by the arrays 330, 384. This may be used for forming two images of particles or combined into a single image representation based on image information acquired from above and below the particles.

It should be realized that the system 300 need not comprise a top detector 330 at all and that rather only light in the backwards direction from the particles in the fluidic channel 316 is detected.

It should also be realized that one or more of the lens 380, the filter 382 and the array 384 of light-detecting elements 386 need not necessarily be integrated on the substrate. On the contrary, if the substrate is transparent, the light in the backwards direction may escape the substrate and may allow mounting any one of the lens 380, the filter 382 and the array 384 separately from the substrate.

Figure 1C:
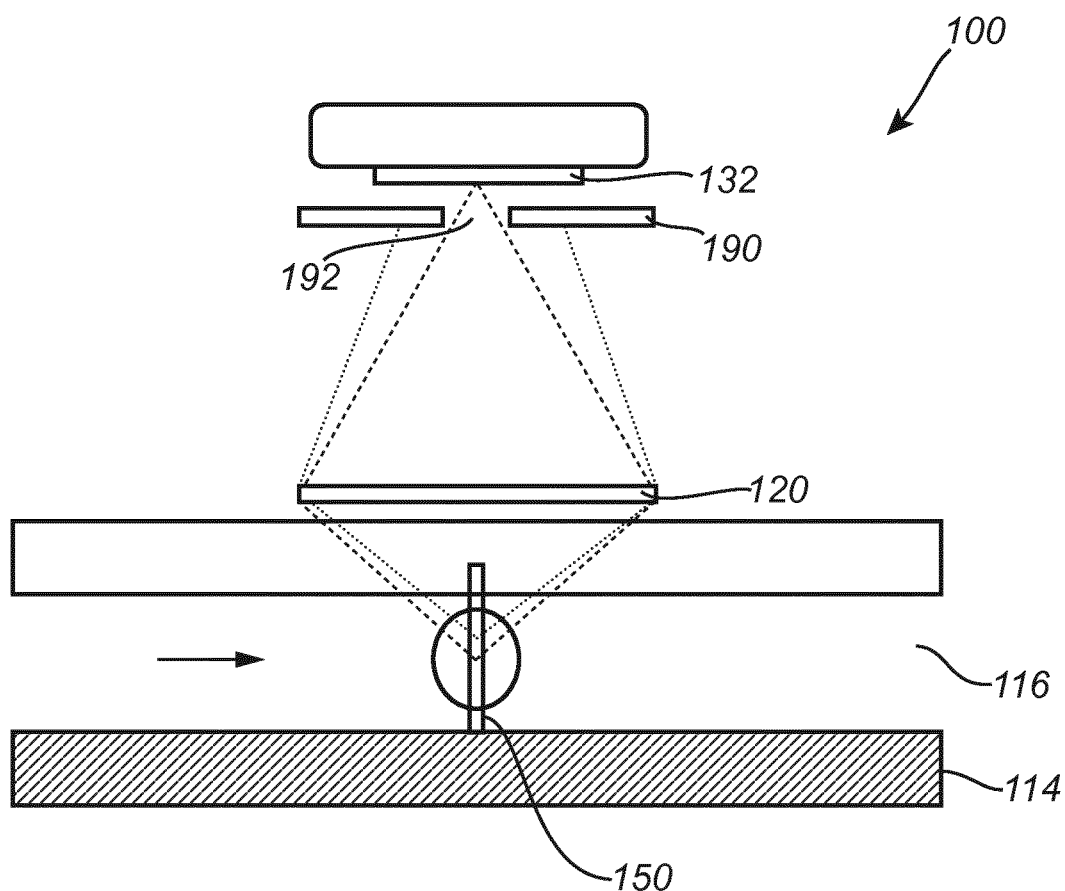
FIG. 1c is a schematic view illustrating confocal imaging in the system for particle imaging according to the first embodiment.

Referring now to FIG. 1c, the system 100 and/or the system 300 may be set up for confocal imaging. Although illustrated here only in relation to detection of forward-scattered light, it should be realized that the confocal imaging may also be used in relation to detection of back-scattered light as discussed above in relation to FIG. 1b. Also or alternatively, fluorescence light being induced in a direction above and/or below the fluidic channel 116, 316 may be detected.

In FIG. 1c, the system 100 is illustrated in relation to a length-wise cross-section of the fluidic channel 116, which also implies that only a single light-detecting element 132 is shown associated with the particular cross-section shown.

The system 100 may comprise a blocking element 190 defining a narrow slit 192 for passing light towards the array of light-detecting elements for providing confocal imaging.

Figure 1D:
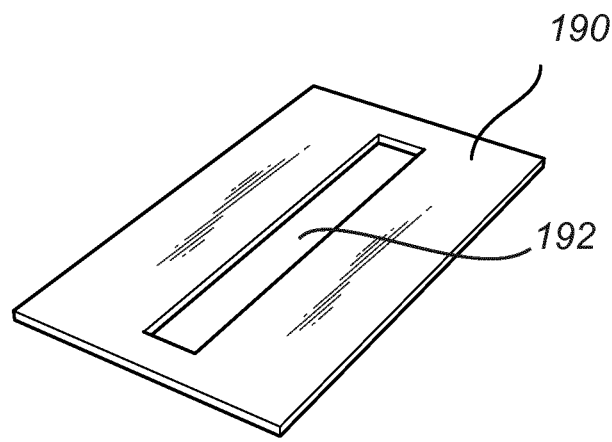
FIG. 1d is a schematic view of a blocking element for realizing confocal imaging.

An embodiment of the blocking element 190 is shown in perspective in FIG. 1d. The blocking element 190 may be formed by a sheet in which a slit 192 is provided through which light may pass towards the array 130 of light-detecting elements 132.

As illustrated in FIG. 1c, light which is out of focus of the lens 120, as illustrated by dotted lines, will be blocked by the blocking element 190, whereas light from a focal point of the lens 120 will pass through the slit 192 to reach the light-detecting element 132, as illustrated by dashed lines. This implies that an increased optical resolution and/or contrast may be provided by the system 100.

According to an alternative, a size of the light-detecting element 132 may define the light reaching the light-detecting element 132 for providing confocal imaging. Thus, the illustrated dimension in FIG. 1c of the light-detecting element, i.e. a size in a direction perpendicular to the row of the array 130, may be so small as to ensure that light out of focus of the lens 120 will not reach the light-detecting element 132.

Figure 1E:
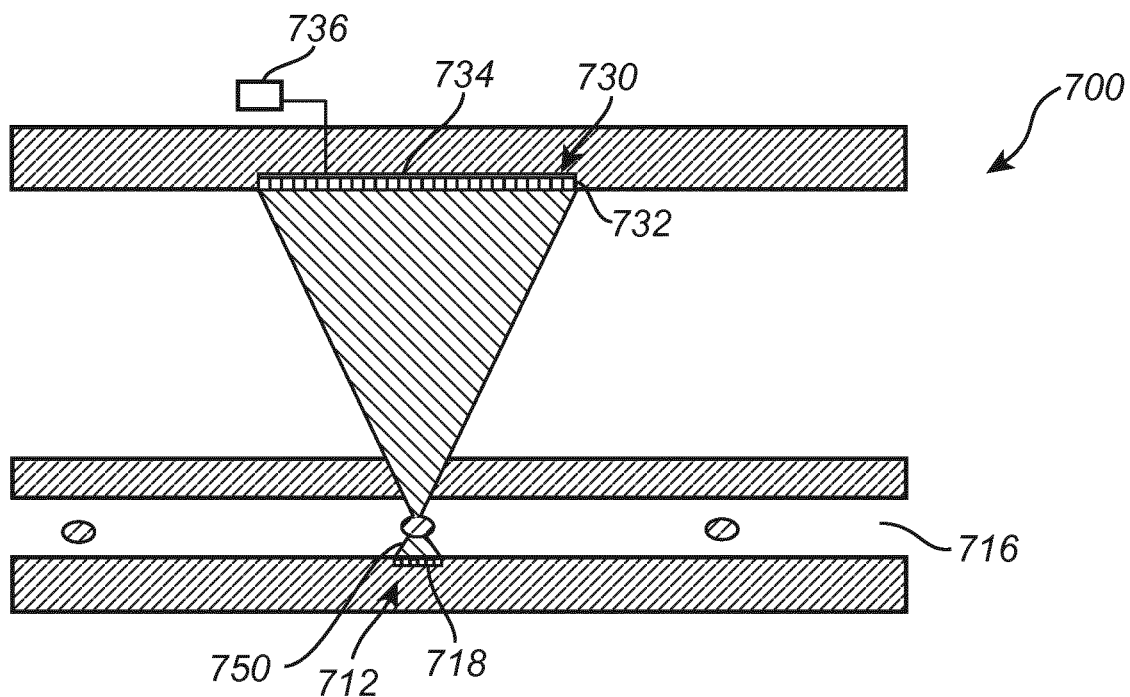
FIG. 1e is a schematic view of a system for particle imaging according to a third embodiment using holographic imaging.

Referring now to FIG. 1e, a system 700 may be used for holographic imaging. Thus, in contrast to the systems 100, 300 discussed above, the system 700 need not comprise any lens.

Rather, the array 730 of light-detecting elements 732 may be configured to receive an interference pattern based on object light being diffracted by the particle and reference light, which is not diffracted. Thus, the array 730 of light-detecting elements 732 may acquire an interference pattern, which may read out by the read-out circuitry 734 and be provided to the processing unit 736 for reconstruction of an image of the particle based on the acquired interference pattern.

The system 700 may comprise a light waveguide 712 with an output coupler 718 for outputting a light beam 750 and providing the light beam 750 in a fluidic channel 716, as described above.

As illustrated in FIG. 1e, the system 700 may provide in-line digital holography of the particle.

Similar to the above-described embodiments of the system, the light beam 750 may be formed as a focused light sheet in the fluidic channel 716. The light sheet 750 may thus define a line in which the light sheet is focused (where a thickness of the light sheet is minimal). This line may provide a one-dimensional section of the particle. The particle flowing through the light sheet focus is thus sectioned by the light beam 750 so that only a narrow cross-section of the particle interacts with the light. The scattered/unscattered light from this cross section is detected by the array 730 of light-detecting elements 732. The array 730 may comprise a single row which is aligned with the light sheet such that the row is aligned with the focus line of the light sheet.

The same light beam 750 may provide "reference" light for forming the interference pattern, based on the unscattered part of illumination light. Hence, only a single light beam 750 may be required for acquiring an interference pattern, which allows for reconstruction of an image of the particle. Such a configuration offers simplicity, as a single light beam 750 may be used.

Figure 1F:
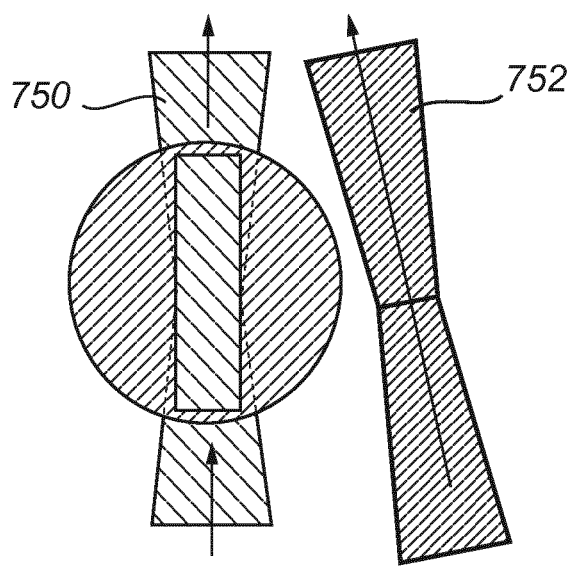
FIG. 1f is a schematic view of light beams to be used in off-axis holographic imaging.

However, according to an alternative, the system 700 may be set up for off-axis digital holography. Thus, as illustrated in FIG. 1f, the system 700 may provide a separate light path for reference light. For instance, the light waveguide 712 may branch light into two paths and output a reference light beam 752, which may not interact with the particle.

The reference beam 752 may be formed with a separate light sheet forming structure, such as an additional output coupler in a separate branch of the light waveguide 712. The reference beam 752 must not interact with the particle in the fluidic channel 716 and may provide a uniform light distribution on the array 730 of light. The reference beam 752 may for instance be formed slightly outside of the fluidic channel 716 so that it is free from interacting with particles. The reference beam 752 is also directed to illuminate the same array 730 of light-detecting elements 732, which also receives the light from the light beam 750 that has been scattered by the particle. Thus, an interference pattern may be acquired by the array 730 of light-detecting elements 732 based on the scattered light from the light beam 750 and the light from the reference beam 752. The interference pattern may then be used for reconstructing an image of the particle.

Referring now to FIG. 2, the array 130 of light-detecting elements 132 may be configured to acquire a sequence of recorded light intensities while the particle moves through the fluidic channel 116 regardless of which optical set-up is used, as discussed above in relation to FIGS. 1a-f. Thus, the processing unit 136 may receive a sequence of representations of detected light intensities by the array 130. Each representation of detected light intensities, such as a frame or a line read out from the array 130 may form a portion of an image, and the processing unit 136 may be configured to combine the received sequence for forming a two-dimensional image of the particle.

As illustrated in FIG. 2 showing a top view of a cell 200 flowing through the fluidic channel 116 along a flow direction A, a thin light sheet of the light beam 150 may be projected by the output coupler 118 into the fluidic channel 116. The light sheet illuminates the flowing cell 200. The induced scatter signal and/or the fluorescent signal may be converged by the lens 120 and collected by the array 130 or an interference pattern may be collected by the array 730.

Since the light sheet is very thin, a small cell segment may be illuminated by the light sheet at an instant in time. Signal from this small segment is acquired by the array 130. When the array 130 is quickly and continuously read out, the whole cell 200 is imaged segment by segment when it flows through the light sheet. Finally, the series of segments may be concatenated by the processing unit 136 and thus a cell image 210 may be constructed.

As a merely illustrating example, in the embodiment using a lens 120, the high throughput and spatial resolution that may be obtained by the system 100 will be described. These numbers on throughput and spatial resolution should not in any way be understood as limiting features, but should merely function as an illustration that the system 100 may enable high throughput of cells 200 through a fluidic channel 116 while allowing imaging of the cells 200 with high spatial resolution.

The array 130 of light-detecting elements 132 may be a line scanner, which may be presently available. A desired size of the array 130, i.e. the number of light detecting elements 132 in the array 130 would depend on a size of a region to be imaged. For example, if the width of the light beam 150 spans 60 μm and a spatial resolution of 0.5 μm is desired, an array 130 including more than 120 light-detecting elements 132 would be needed.

A size of the light-detecting elements 132 may need to be smaller than a resolution given by the lens system taking into account a magnification. For instance, a numerical aperture NA of the system may be determined as NA=n*sin θ, where n is a refraction index of a medium in which the lens 120 works (approximately 1.5 if the lens is arranged on the substrate 114) and θ is a maximal half-angle of a cone of light that can enter the lens 120, i.e. describing a range of angles of light being accepted by the lens 120 and focused towards the array 130. Using an angle θ of π/4, the numerical aperture NA=1.5 sin(Pi/4)≈0.06.

A resolution R of the system may be expressed as R=0.61*λ/NA, where λ is a wavelength of light. With a wavelength of light of 600 nm, the resolution becomes R=0.61*(600 nm)/NA≈345.3 nm. Further, using a magnification of the system of 50, this implies that the size of the light-detecting element may need to be maximally 17.26 μm, which is well within sizes of available line scanners.

A rate at which detected light intensities should be captured and read out will depend on a flow speed through the fluidic channel 116. High flow speed may also help to minimize image blurring as a short exposure time is needed. For example, a line scanner may be used with a 1 MHz line scan rate. A maximum speed v allowed through the fluidic channel 116 may be expressed as v=d*f where d is the distance the cell 200 may be allowed to move between sequential lines being acquired and f is the line scan rate. Having a resolution of 0.5 μm, the distance d thus is 0.5 μm and the maximum speed v=0.5 μm*1 MHz=0.5 m/s flow speed through the fluidic channel 116. This may correspond to a throughput of 10000 cells/s, depending on cell size.

However, a lower flow speed may help to improve signal quality. Therefore, the flow speed may need to be chosen balancing imaging sensitivity and clarity.

Figure 3A:
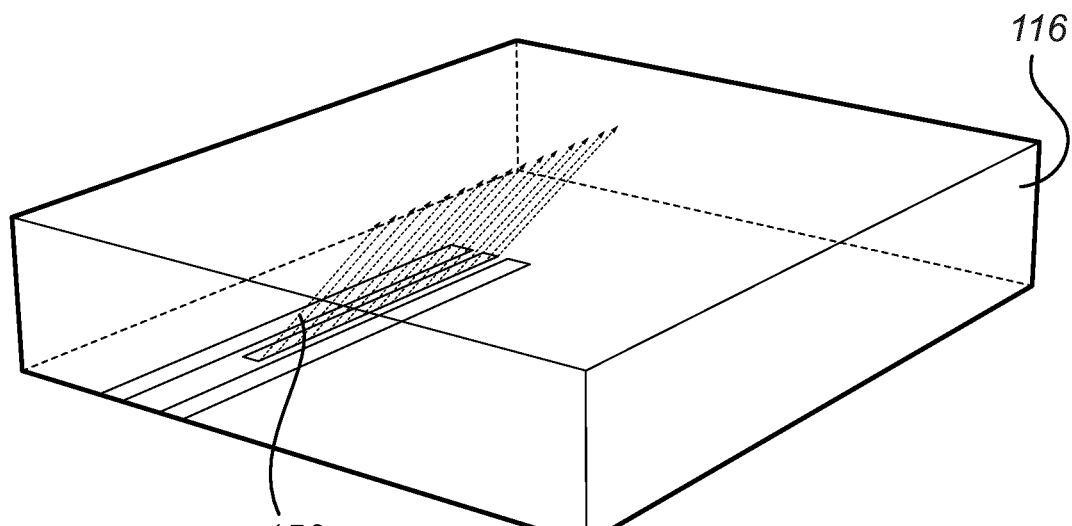
FIGS. 3a-c are schematic views illustrating a shape of a light beam in the fluidic channel.
Figure 3B:
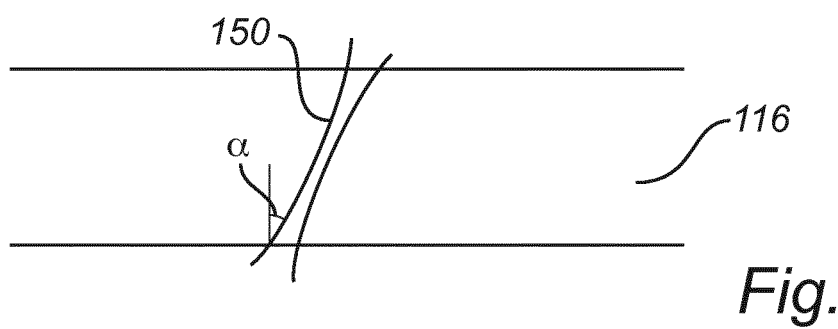
Figure 3C:
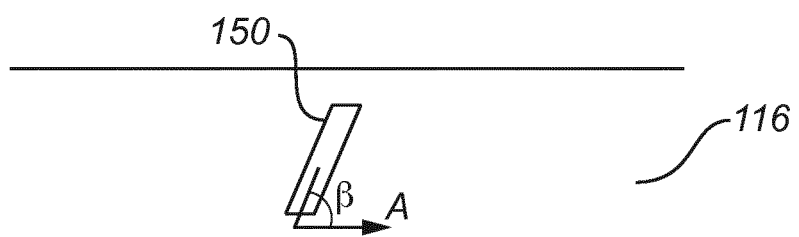

Referring now to FIGS. 3a-c, the light beam 150 will be further described. The output coupler 118 is designed such that a thin light sheet, as shown in FIG. 3a, is formed to illuminate passing cells 200 in the fluidic channel 116. The light sheet may be very thin (e.g. 0.5 μm) at a location in the fluidic channel 116 where the cell 200 is illuminated. The light beam 150 may have a sheet-like shape extending in a certain height and width range, e.g. each of the height and width size exceeding 1.5× a diameter of the cell 200. Within the sheet-like shape, the light beam may be very thin.

Referring to FIG. 3b, showing a side view of the fluidic channel 116, the height of the sheet-like shape of the light beam 150 refers to an extension between a light entrance wall and a light exit wall of the fluidic channel 116. If the fluidic channel 116 is arranged on the light waveguide 112, the light entrance wall will be a bottom wall of the fluidic channel 116 and the light exit wall will be a top wall of the fluidic channel 116. However, if the light waveguide 112 and the fluidic channel 116 are formed on a common surface, the light entrance and the light exit walls may be opposing side walls of the fluidic channel 116.

The light beam 150 may be tilted in relation to the fluidic channel 116, such that a propagation direction of the light beam 150 from the light entrance wall to the light exit wall of the fluidic channel 116 is not along a normal of the light entrance wall or the light exit wall, respectively, as illustrated by angle α in FIG. 3b. If the angle α differs from 0°, the light beam 150 may be directed away from reaching an array 130, which may be beneficial in that detected light is not drowned in a high intensity of direct light from the light beam 150. In an embodiment, the angle α may be in a range of 0-45°.

Referring to FIG. 3c showing a top view of the fluidic channel 116, the width of the sheet-like shape of the light beam 150 refers to an extension between the walls of the fluidic channel 116 which are not the light entrance wall and the light exit wall. The light beam 150 may have a width such that an entire segment or cross-section of the cell 200 will be illuminated by the light beam 150 when the cell 200 passes the light beam 150.

The width of the sheet-like shape of the light beam 150 may extend perpendicular to the flow direction in the fluidic channel. However, the width need not necessarily be transverse or perpendicular to the flow direction A, but may form an angle R, e.g. in the range of 45-135°, to the longitudinal direction of the fluidic channel 116. If the angle β differs from 90°, the light beam 150 may also be directed away from reaching the array 130, which may be beneficial in that detected light is not drowned in a high intensity of direct light from the light beam 150.

The light beam may be arranged such that the width of the light beam 150 extend in a central portion of the fluidic channel 116. Thus, the light beam 150 may not illuminate a portion of the fluidic channel 116 close to side walls, i.e. the walls of the fluidic channel 116 which are not the light entrance wall and the light exit wall. This may be advantageous, because if light interacts with a side wall of the fluidic channel 116, it may affect imaging of the particle in the fluidic channel 116.

Further, the sheet-like shape of the light beam 150 may have a thickness in a direction perpendicular to the width and the height of the light beam 150. The thickness of the light beam 150 may be substantially along the flow direction in the fluidic channel 116 (depending on the angle (β between the width and the longitudinal direction of the fluidic channel 116) and may thus define a thickness of a segment of the cell 200 being imaged at a time.

It should be realized that the thickness of the light beam 150 may be relatively thick, e.g. even larger than a diameter size of the cell 200, such as up to several times the diameter size of the cell 200. This may e.g. be combined with a one-dimensional array 130 or an array 130 having very few rows, which may ensure that only a segment of the cell 200 is imaged at a time. However, a quality of imaging may be reduced due to interference of light from adjacent segments of the cell 200 (not to be imaged) reaching the light-detecting elements 132. As an alternative, a relatively thick light beam 150 may be used for providing a relatively coarse imaging of the cell 200 in a flow direction of the fluidic channel 116.

Multi-color fluorescence images may be desirable for cell imaging, which may be achieved using multiple excitation wavelengths with same or a larger amount of emission wavelengths.

Figure 4:
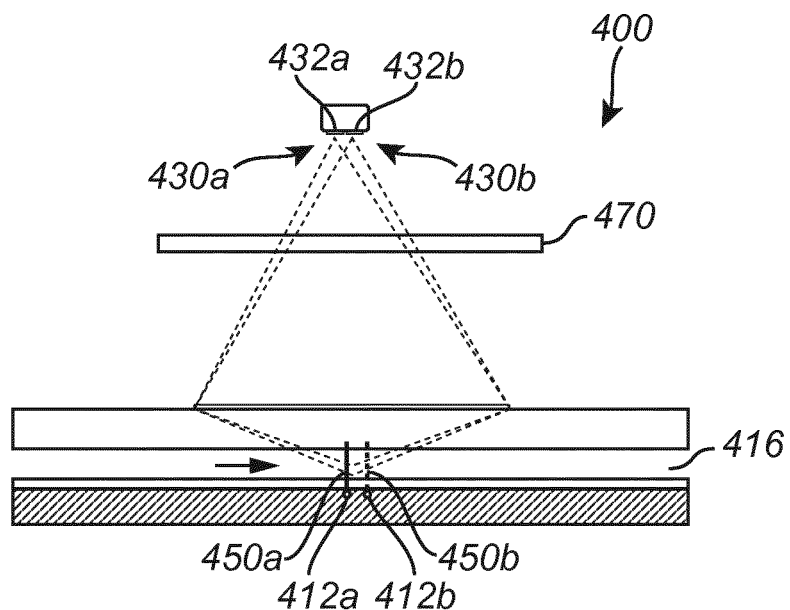
FIG. 4 is a schematic view of a system for particle imaging according to a third embodiment.

Referring now to FIG. 4, a system 400 will be described, which may be used for multi-color fluorescence imaging. However, the system 400 may be used for any type of imaging, wherein plural light beams are used.

The system 400 comprises a first light waveguide 412a and a second light waveguide 412b. The light waveguides may each have an input coupler and an output coupler and may be associated with two different external light sources. The external light sources may provide light of different wavelengths, such that the first light waveguide 412a may output a first light beam 450a of a first wavelength and the second light waveguide 412b may output a second light beam 450b of a second wavelength, different from the first wavelength. Each of the light beams 450a, 450b may form a sheet-like shape as discussed above for the light beam 150.

According to one embodiment, the system 400 may be configured for spatially differentiated excitation of particles in the fluidic channel 416. The two light beams 450a, 450b are arranged to be parallel and to illuminate different portions of the fluidic channel 416 along the longitudinal direction of the fluidic channel 416.

If the light beams 450a, 450b are arranged sufficiently close to each other, the same lens 420 (if a lens is used) may be shared for projecting the light induced by the light beams 450a, 450b interacting with particles to the image plane.

Since the two light beams 450a, 450b illuminate a particle at two different places along the fluidic channel 416, the array of light-detecting elements may need to comprise a first array 430a of light-detecting elements 432a and a second array 430b of light-detecting elements 432b. Each of the arrays 430a, 430b may comprise e.g. a one-dimensional array and may be configured in any manner as discussed above for the array 130.

The first array 430a may thus detect light induced by the first light beam 450a and the second array 430b may thus detect light induced by the second light beam 450b. The arrays 430a, 430b may be configured to output image information to a common processing unit 436 or to two different processing units each processing information from a single array 430a, 430b. The image information acquired by the two arrays 430a, 430b may be combined into a single image, e.g. as two different color channels within the single image.

Figure 5:
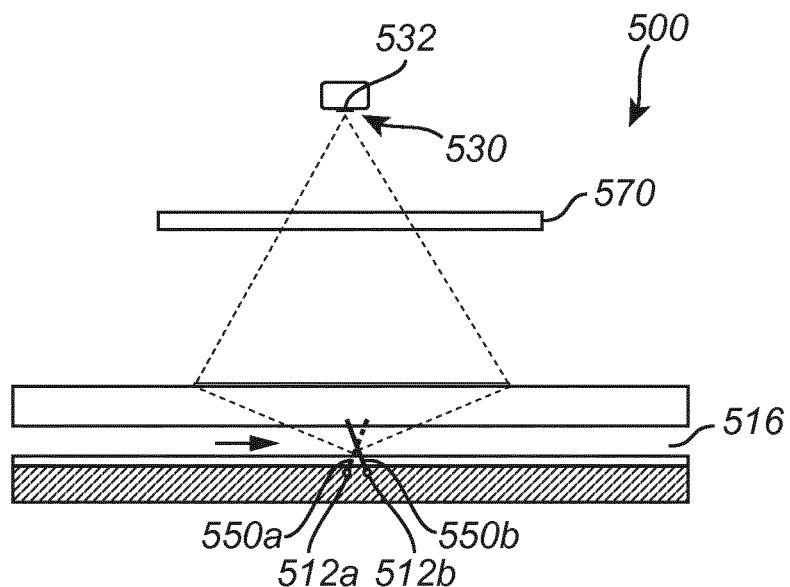
FIG. 5 is a schematic view of a system for particle imaging according to a fourth embodiment.

Referring now to FIG. 5, another system 500 will be described, which may be used for multi-color fluorescence imaging. However, the system 500 may be used for any type of imaging, wherein plural light beams are used.

The system 500 also comprises a first light waveguide 512a and a second light waveguide 512b. The light waveguides may each have an input coupler and an output coupler and may be associated with two different external light sources. The external light sources may provide light of different wavelengths, such that the first light waveguide 512a may output a first light beam 550a of a first wavelength and the second light waveguide 512b may output a second light beam 550b of a second wavelength, different from the first wavelength. Each of the light beams 550a, 550b may form a sheet-like shape as discussed above for the light beam 150.

The system 500 may be configured for excitation of particles in the fluidic channel 516 in a common position in the fluidic channel 516. The two light beams 550a, 550b are arranged to be tilted towards each other from spatially separate light waveguides 512a, 512b, such that the light beams 550a, 550b will intersect each other, e.g. in a central part of the fluidic channel 516 between the light entrance wall and the light exit wall.

Since the excitation of the particle takes place at a common position in the fluidic channel 516, the light induced by the light beams 550a, 550b may be projected by the lens 520 to the same place in the image plane.

This implies that a single array 530 of light-detecting elements 532 may be sufficient in order to detect the light induced by the light beams 550a, 550b.

Regardless of whether the system 400 or the system 500 is used, since multiple emission wavelengths may be projected towards the array(s) 430a, 430b; 530 of light-detecting elements, multi-color filters 470; 570 may be needed to remove an excitation wavelength component and in order to separate the emission light beams.

The emission light beams to be detected by the array(s) 430a, 430b; 530 of light-detecting elements may be separated in either space or time. With a diffractive lens, emission light of different wavelengths can be projected towards different angles and finally detected by different arrays of light-detecting elements. Thus, a diffractive lens may be used in the system 500 in order to separate the emission light beams induced by the light beams 550a, 550b and enable separately detecting the emission light beams in the same array (having dedicated rows for each of the emission light beams) or even in different arrays.

Alternatively, classical beam splitting techniques can also be employed to project the multi-color emission lights to different arrays.

According to another embodiment, excitation light beams 550a, 550b may be separated in time domain. The separation in time may be synchronized with filtering and detection of the emission beams by the array of light-detecting elements.

For example, switching between multiple color filters may be performed very quickly when the multiple color filters are mounted on a spin disk. A color filter switching signal may trigger both output of the multiple light beams 550a, 550b to toggle on/off and the array 530 of light-detecting elements 532 to detect light. The switching on/off of excitation light may e.g. be realized by a pulsed laser, or by a microelectromechanical system mirror or an acoustic modulator.

The system according to any of the embodiments described above may further be configured for parallel imaging of particles. Thus, a plurality of fluidic channels may be provided such that imaging of particles in the plurality of fluidic channels may be simultaneously performed.

Thus, a plurality of identical systems may be provided on a common substrate. Each system may be separate for particle imaging in a respective fluidic channel.

The system may thus be provided with a plurality of light waveguides, such that a light beam as described above may be output into each of the plurality of fluidic channels.

However, rather than being separate systems on a common substrate, the light waveguides (for different fluidic channels) may be associated with a single light source, which may input light to each of the light waveguides for illuminating the particles in the plurality of fluidic channels.

The system may comprise separate arrays of light-detecting elements for detecting light from particles in different fluidic channels. However, according to an embodiment, the system may be set up such that a single array of light-detecting elements is used for detecting light originating from different fluidic channels.

In an embodiment, a large one-dimensional array of light-detecting elements may be provided, such that different light-detecting elements in the array are configured to detect light from different fluidic channels. In another embodiment, a two-dimensional array of light-detecting elements may be provided, such that different rows of the array of light-detecting elements are configured to detect light originating from different fluidic channels. It should be realized that the array of light-detecting elements may be configured in other manners for detecting light from different fluidic channels.

Figure 6:
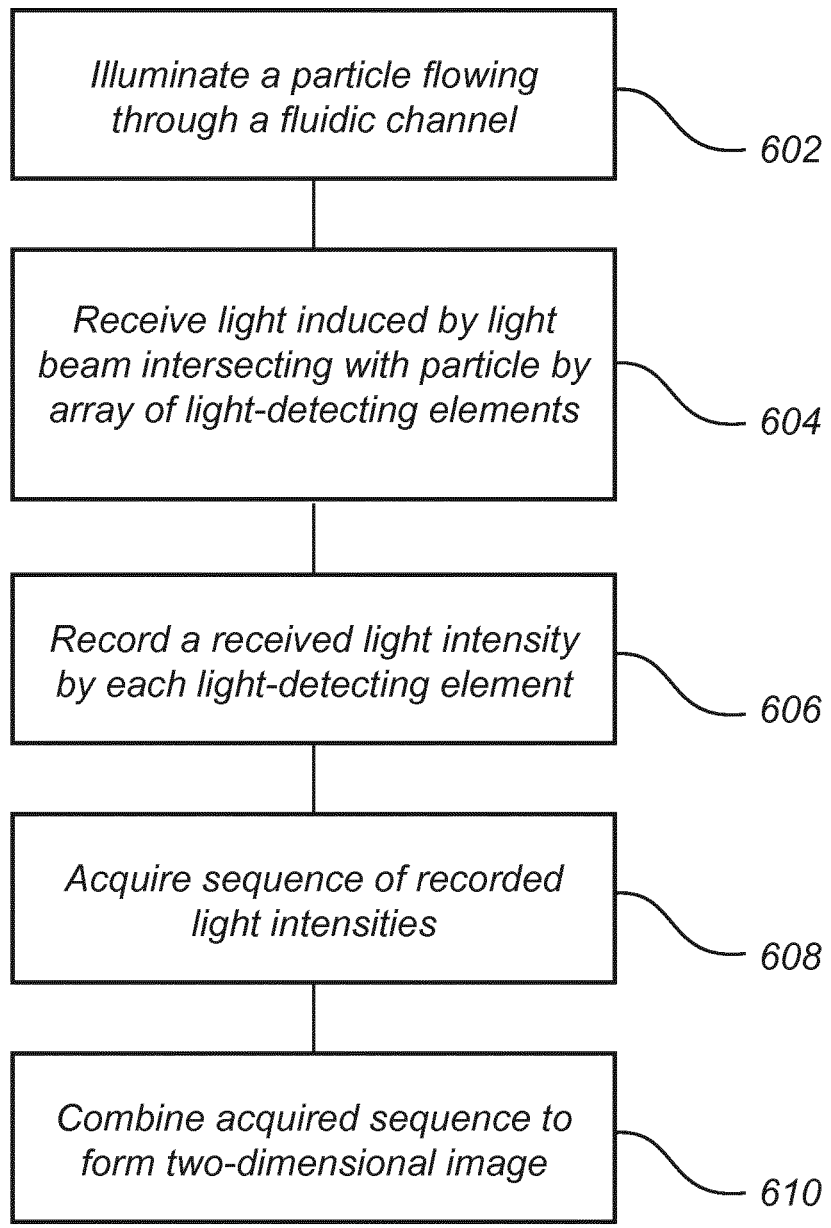
FIG. 6 is a flowchart of a method for particle imaging.

Referring now to FIG. 6, a method for particle imaging will be described. The method may be performed using any of the systems 100, 300, 400, 500, 700 described above.

The method comprises illuminating 602 a particle moving through a fluidic channel. The particle is illuminated by means of a light beam that forms a sheet-like shape as described above. Thus, the illuminating of the particle may select a segment of the particle which is being illuminated and hence may be imaged at a point in time.

The method further comprises receiving 604, light induced by the light beam interacting with the particle in the fluidic channel by an array of light-detecting elements. The light may or may not pass a lens, which may converge the received light towards an array of light-detecting elements such that each light-detecting element detects light originating from a corresponding position in the fluidic channel.

The method further comprises recording 606 a received light intensity by each of the light-detecting elements in the array for forming image information of a portion of the particle.

Each of the light-detecting elements may be associated with readout circuitry such that the light intensities detected by the light-detecting elements may be read out in a very fast manner. Thanks to the illuminating by the light beam being arranged to select a portion in the fluidic channel that is to be imaged at a specific point in time, the array of light-detecting elements may be configured with a simple structure so as to enable very fast readout of the image information in the array.

Hence, a segment of a particle may be imaged at a point in time and the method may allow a high flow speed in the fluidic channel while still allowing each sequential segment of the particle passing the light beam to be imaged by the array. This also implies that a high throughput may be used in the fluidic channel.

The method may further comprise acquiring 608 a sequence of recorded light intensities while the particle moves through the fluidic channel.

Also, the method may comprise combining 610 an acquired sequence of recorded light intensities. Each set of recorded light intensities in the sequence may correspond to image information representing a segment of the particle. Thus, by combining the acquired sequence of recorded light intensities a two-dimensional image of the particle may be formed.

In the above the inventive concept has mainly been described with reference to a limited number of examples. However, as is readily appreciated by a person skilled in the art, other examples than the ones disclosed above are equally possible within the scope of the inventive concept, as defined by the appended claims.

For instance, although the device for illuminating a particle is described having one or two light waveguides, it should be realized that even further light waveguides may be used, wherein each light waveguide may be configured to output a unique wavelength. The light waveguides may be used for providing light beams separated in space or in time domain.

The invention claimed is:

1. A device for illuminating a particle in a fluidic channel, the device comprising:
    a light waveguide arranged on a substrate;
    an output coupler configured to output light from the light waveguide to form a light beam, wherein the light beam forms a sheet-like shape such that at a distance from the output coupler the light beam has a cross-section which has an extension in a first direction being larger than a size of a particle; and
    a fluidic channel arranged on the substrate for guiding a flow of particles through the fluidic channel along a longitudinal direction of the fluidic channel;
    wherein the light waveguide and the fluidic channel are arranged in relation to each other such that the light beam at said distance from the output coupler is arranged within the fluidic channel, wherein the first direction of the cross-section of the light beam forms an angle to the longitudinal direction of the fluidic channel.

2. The device according to claim 1, wherein the output coupler is configured to output light, wherein the light beam has a cross-section which has a large extension in the first direction and a small extension in a second direction, the small extension being smaller than the size of a particle.

3. The device according to claim 1, wherein the first direction of the light beam is transverse to the longitudinal direction of the fluidic channel.

4. The device according to claim 1, wherein the extension in the first direction of the cross-section of the light beam extends substantially across a cross-section of the fluidic channel from a first side wall of the fluidic channel to a second side wall of the fluidic channel opposite to the first side wall.

5. The device according to claim 1, wherein the light waveguide and the fluidic channel are arranged in relation to each other such that the light beam from the output coupler enters the fluidic channel through a light entrance wall of the fluidic channel for propagating towards a light exit wall of the fluidic channel opposite to the light entrance wall, and wherein the light beam has a cross-section with a large extension and a small extension throughout the fluidic channel between the light entrance wall and the light exit wall.

6. The device according to claim 1, wherein the device further comprises a lens arranged on the substrate, wherein the lens is configured to receive light induced by the light beam interacting with a particle in the fluidic channel and converge the received light.

7. The device according to claim 1, wherein the light waveguide is a first light waveguide and the output coupler is a first output coupler configured to form a first light beam and wherein the device further comprises a second light waveguide and a second output coupler for forming a second light beam, which forms a sheet-like shape such that at a distance from the second output coupler the second light beam has a cross-section with a large extension in a first direction and a small extension in a second direction.

8. The device according to claim 7, wherein the first output coupler is arranged to output the first light beam to enter the fluidic channel through a light entrance wall at a first cross-section of the fluidic channel and the second output coupler is arranged to output the second light beam to enter the fluidic channel through the light entrance wall at a second cross-section of the fluidic channel downstream to the first cross-section.

9. The device according to claim 7, wherein the sheet-like shape of the first light beam is tilted towards the second cross-section from the light entrance wall to a light exit wall of the fluidic channel and wherein the sheet-like shape of the second light beam is tilted towards the first cross-section from the light entrance wall to the light exit wall of the fluidic channel, such that the first light beam and the second light beam will intersect at a central portion of the fluidic channel.

10. A system for particle imaging; said system comprising:
 a device for illuminating a particle according to claim 1; and
 an array of light-detecting elements; wherein the array of light-detecting elements is configured such that each light-detecting element detects light originating from a corresponding position in the fluidic channel.

11. The system according to claim 10, wherein the system comprises a device, wherein the light waveguide is a first light waveguide and the output coupler is a first output coupler configured to form a first light beam and wherein the device further comprises a second light waveguide and a second output coupler for forming a second light beam, which forms a sheet-like shape such that at a distance from the second output coupler the second light beam has a cross-section with a lame extension in a first direction and a small extension in a second direction, wherein the array of light-detecting elements is a first array and the system further comprises a second array of light-detecting elements, wherein the first array is configured to receive light induced by the first light beam interacting with a particle in the fluidic channel and the second array is configured to receive light induced by the second light beam interacting with a particle in the fluidic channel.

12. The system according to claim 10, further comprising a filter for removing excitation light from the light beam; and passing fluorescence light induced by the light beam.

13. The system according to claim 10, further comprising a processing unit, which is configured to receive a sequence of recorded light intensities by the array of light-detecting elements acquired while the particle moves through the fluidic channel and to combine the received sequence for forming a two-dimensional image of the particle.

14. A method for particle imaging, said method comprising:
 illuminating a particle moving through a fluidic channel, said particle being illuminated by means of a light beam that forms a sheet-like shape such that at a position within the fluidic channel, the light beam has a cross-section with a large extension in a first direction and a small extension in a second direction, the large extension being larger than a size of the particle and the small extension being smaller than the size of a particle;
 receiving, light induced by the light beam interacting with a particle in the fluidic channel by an array of light-detecting elements such that each light-detecting element detects light originating from a corresponding position in the fluidic channel;
 recording a received light intensity by each of the light-detecting elements in the array for forming image information of a portion of the particle.

15. The method according to claim 14, further comprising acquiring a sequence of recorded light intensities while the particle moves through the fluidic channel, and combining the received sequence for forming a two-dimensional image of the particle.

* * * * *